(12) United States Patent
Chien et al.

(10) Patent No.: US 6,662,160 B1
(45) Date of Patent: Dec. 9, 2003

(54) ADAPTIVE SPEECH RECOGNITION METHOD WITH NOISE COMPENSATION

(75) Inventors: Jen-Tzung Chien, Tainan (TW); Kuo-Kuan Wu, Hsinchu (TW); Po-Cheng Chen, Hsinchu (TW)

(73) Assignee: Industrial Technology Research Inst., Hsinchu (TW)

( * ) Notice: Subject to any disclaimer, the term of this patent is extended or adjusted under 35 U.S.C. 154(b) by 366 days.

(21) Appl. No.: 09/696,293

(22) Filed: Oct. 26, 2000

(30) Foreign Application Priority Data

Aug. 30, 2000 (TW) .................................... 89117570 A

(51) Int. Cl.[7] ............................................. G10L 15/14
(52) U.S. Cl. ..................................................... 704/256
(58) Field of Search ................... 704/256, 202, 704/234, 251, 240

(56) References Cited

U.S. PATENT DOCUMENTS

| | | | | |
|---|---|---|---|---|
| 4,852,171 A | * | 7/1989 | Jakatdar et al. | 704/240 |
| 5,793,891 A | * | 8/1998 | Takahashi et al. | 704/202 |
| 5,812,972 A | * | 9/1998 | Juang et al. | 704/234 |
| 5,864,806 A | * | 1/1999 | Mokbel et al. | 704/234 |
| 5,930,753 A | * | 7/1999 | Potamianos et al. | 704/256 |

OTHER PUBLICATIONS

Chien et al ("Frame Synchronous Noise Compensation For Hands–Free Speech Recognition In Car Environments", IEE Proceedings—Vision, Image and Signal Processing, Dec., 2000).*

Lawerence R. Rabiner, Fellow, IEEE; "A Tutorial on Hidden Markov Models and Selected Applications in Speech Recognition"; Feb. 1989; vol. 77, No. 2; pp. 257–286.

Andrew J. Viterbi, Senior member, IEEE; "Error Bounds for Convolutional Codes and an Asymptotically Optimum decoding Algorithm"; Apr. 1967; vol. IT13, No. 2; pp. 260–269.

David mansour and Biing Hwang Juang, Senior member, IEEE; "A Family of Distortion measures Based Upon Projection Operation for Robust Speech Recognition"; Nov. 1989; vol. 37, No. 11; pp. 1659–1671.

Beth A. Carlson and Mark Clements; "A Projection–Based Likelihood Measure for Speech Recognition in Noise"; Jan. 1994; vol. 2, No. 1, Part 1; pp. 97–102.

* cited by examiner

*Primary Examiner*—Richemond Dorvil
*Assistant Examiner*—Daniel Nolan
(74) *Attorney, Agent, or Firm*—Bacon & Thomas, PLLC

(57) ABSTRACT

An adaptive speech recognition method with noise compensation is disclosed. In speech recognition, optimal equalization factors for feature vectors of a plurality of speech frames corresponding to each probability density function in a speech model are determined based on the plurality of speech frames of the input speech and the speech model. The parameters of the speech model are adapted by the optimal equalization factor and a bias compensation vector, which is corresponding to and retrieved by the optimal equalization factor. The optimal equalization factor is provided to adjust a distance of the mean vector in the speech model. The bias compensation vector is provided to adjust a direction change of the mean vector in the speech model.

9 Claims, 4 Drawing Sheets

| $\lambda_e$ | $\mathbf{b}(\lambda_e)$ |
|---|---|
| −0.50 | −1.3 |
| −0.49 | −1.29 |
| −0.48 | −1.30 |
| −0.47 | −1.25 |
| −0.46 | −1.25 |
| −0.45 | −1.28 |
| −0.44 | −1.23 |
| −0.43 | −1.20 |
| −0.42 | −1.26 |
| −0.41 | −1.27 |
| −0.40 | −1.26 |
| ⋮ | ⋮ |
| 2.95 | −0.49 |
| 2.96 | −0.49 |
| 2.97 | −0.48 |
| 2.98 | −0.49 |
| 2.99 | −0.50 |
| 3 | −0.50 |

FIG. 4

ADAPTIVE SPEECH RECOGNITION METHOD WITH NOISE COMPENSATION

BACKGROUND OF THE INVENTION

1. Field of the Invention

The present invention relates to the field of speech recognition and, more particularly, to an adaptive speech recognition method with noise compensation.

2. Description of Related Art

It is no doubt that the robustness issue is crucial in the area of pattern recognition because, in real-world applications, the mismatch between training and testing data may occur to severely degrade the recognition performance considerably. For such a speech recognition problem, the mismatch comes from the variability of inter- and intra-speakers, transducers/channels and surrounding noises. For instance, considering the application of speech recognition for hands-free voice interface in a car environment, the non-stationary surrounding noises of engine, music, babble, wind, echo under different driving speeds will vary and hence deteriorate the performance of the recognizer.

To solve the problem, a direct method is to collect enough training data from various noise conditions to generate speech models, such that proper speech models can be selected based on the environment of a specific application. However, such a method is impractical for the application in a car environment because of the complexity of noise and the tremendous amount of training data to be collected. In addition, the method requires additional mechanism to detect the change in the environment, and such environmental detector is difficult to design.

Alternatively, a feasible approach is to build an adaptive speech recognizer where the speech models can be adapted to new environments using environment-specific adaptation data.

In the context of statistical speech recognition, the optimal word sequence W of an input utterance $X=\{x_t\}$ is determined according to the Bayes rule:

$$\hat{W} = arg_w \max p(W|X) = arg_w \max p(X|W)p(W), \quad (1)$$

where p(X|W) is the occurrence probability of X when the word sequence of X is W, and p(W) is the occurrence probability of word W based on the prior knowledge of word sequence. The description of such a technique can be found in RABINER, L. R.: 'A tutorial on hidden Markov models and selected applications in speech recognition', Proceedings of IEEE, 1989, vol. 77, pp. 257–286, which is incorporated herein for reference. Using a Markov chain to describe the change of the feature of the speech parameters, the p(X|W) can be further expressed, based on the HMM (Hidden Markov Model) theory, as follows:

$$p(X|W) = \sum_{all\ S} p(X, S|W) = \sum_{all\ S} p(X|S, W)p(S|W), \quad (2)$$

where S is the state sequence of the speech signal X.

In general, the computations of (1) and (2) are very expensive and almost unreachable because all possible S must be considered. One efficient approach is to apply the Viterbi algorithm and decode the optimal state sequence $\hat{S}=\{\hat{s}_t\}$, as described in VITERBI, A. J.: 'Error bounds for convolutional codes and an asymptotically optimal decoding algorithm', IEEE Trans. Information Theory, 1967, vol. IT-13, pp. 260–269, which is incorporated herein for reference. As such, the summation over all possible state sequences in (2) is accordingly approximated by the single most likely state sequence, i.e.

$$p(X|W) \cong p(X|\hat{S}, W)p(\hat{S}|W) = \pi_{\hat{s}_0} \prod_{t=1}^{T} a_{\hat{s}_{t-1}\hat{s}_t} b_{\hat{s}_t}(x_t), \quad (3)$$

where $\pi_{\hat{s}_0}$ is the initial state probability, $a_{\hat{s}_{t-1}\hat{s}_t}$ is the state transition probability and $b_{\hat{s}_t}(x_t)$ is the observation probability density function of $x_t$ in state $\hat{s}_t$, which is modeled by a mixture of multivariate Gaussian densities; that is:

$$b_{\hat{s}_i}(x_t) = \quad (4)$$

$$p(x_t|\hat{s}_t=i, W) = \sum_{k=1}^{K} \omega_{ik} f(x_t|\theta_{ik}) = \sum_{k=1}^{K} \omega_{ik} N(x_t|\mu_{ik}, \Sigma_{ik}).$$

Herein, $\omega_{ik}$ is mixture weight, and $\mu_{ik}$ and $\Sigma_{ik}$ are respectively the mean vector and covariance matrix of the k-th mixture density function for the state $\hat{s}_t=i$. The occurrence probability $f(x_t|\theta_{ik})$ of frame $x_t$ associated with the density function $\theta_{ik}=(\mu_{ik},\Sigma_{ik})$ is expressed by:

$$f(x_t|\theta_{ik})=(2\pi)^{-D/2}|\Sigma_{ik}|^{-1/2}\exp[-1/2(x_t-\mu_{ik})'\Sigma_{ik}^{-1}(x_t-\mu_{ik})]. \quad (5)$$

The construction of speech recognition system is achieved by determining the HMM parameters, such as $\{\mu_{ik},\Sigma_{ik}\}$, $\{\omega_{ik}\}$ and $\{a_{ij}\}$. The speech recognition system is thus operated by using Viterbi algorithm to determine the optimal word sequence for the input speech. However, the surrounding noises will cause a mismatch between the speech features of the application environment and the training environment. As a result, the established HMM's can not correctly describe the input speech, and the recognition rate is decreased. Particularly in the car environment, the noises are so adverse so that the performance of the speech recognition system in the car is much lower than that in a clean environment. Therefore, in order to implement, for example, an important application for human-machine voice interface in car environments, an adaptive speech recognition method with noise compensation is desired, so as to promote the recognition rate.

Moreover, Mansour and Juang observed that the additive white noise would cause the norm shrinkage of speech cepstral vector, and a description of such can be found in MANSOUR, D. and JUANG, B.-H.: 'A family of distortion measures based upon projection operation for robust speech recognition', IEEE Trans. Acoustic, Speech, Signal Processing, 1989, vol. 37, pp. 1659–1671, which is incorporated herein for reference. They consequently designed a distance measure where a scaling factor was introduced to compensate the cepstral shrinkage for cepstrum-based speech recognition. This approach was further extended to the adaptation of HMM parameters by detecting an equalization scalar λ between probability density function unit $\theta_{ik}$ and noisy speech frame $x_t$, as described in CARLSON, B. A. and CLEMENTS, M. A.: 'A projection-based likelihood measure for speech recognition in noise', IEEE Transactions on Speech and Audio Processing, 1994, vol. 2, no. 6, pp. 97–102, which is incorporated herein for reference. The probability measurement in (5) is modified to:

$$f(x_t|\lambda,\theta_{ik})=(2\pi)^{-D/2}|\Sigma_{ik}|^{-1/2}\exp[-1/2(x_t-\lambda\mu_{ik})'\Sigma_{ik}^{-1}(x_t-\lambda\mu_{ik})]. \quad (6)$$

The optimal equalization factor $\lambda_e$ is determined by directly maximizing the logarithm of (6) as follows:

$$\lambda_e = arg\ \max_{\lambda} \log f(x_t | \lambda, \theta_{ik}) = \frac{x_t' \sum_{ik}^{-1} \mu_{ik}}{\mu_{ik}' \sum_{ik}^{-1} \mu_{ik}}. \quad (7)$$

Geometrically, this factor is equivalent to the projection of $x_t$ upon $\mu_{ik}$ weighted by $\Sigma_{ik}^{-1}$. The use of $\lambda_e$ to compensate the influence of the white noise is proved to be helpful in increasing the speech recognition rate. However, for the problem of speech recognition in car environments, the surrounding noise is non-white and sophisticated to characterize. It is thus insufficient to adapt the HMM mean vector $\mu_{ik}$ by only applying the optimal equalization scalar $\lambda_e$. Therefore, there is a need for the above speech recognition method to be improved.

SUMMARY OF THE INVENTION

The object of the present invention is to provide an adaptive speech recognition method with noise compensation for effectively promoting the speech recognition rate in a noisy environment.

To achieve the object, the adaptive speech recognition method with noise compensation in accordance with the present invention is capable of compensating noises of an input speech by adjusting parameters of a HMM speech model. The method includes the following steps: (A) determining, based on the plurality of speech frames of the input speech and the speech model, optimal equalization factors for feature vectors of the plurality of speech frames corresponding to each probability density function in the speech model; and (B) adapting the parameters of the speech model by the optimal equalization factor and a bias compensation vector corresponding to and retrieved by the optimal equalization factor, wherein the optimal equalization factor is provided to adjust a distance of the mean vector in the speech model, and the bias compensation vector is provided to adjust a direction change of the mean vector in the speech model.

Other objects, advantages, and novel features of the invention will become more apparent from the following detailed description when taken in conjunction with the accompanying drawings.

BRIEF DESCRIPTION OF THE DRAWINGS

FIG. 4 is an exemplary reference function table established according to FIG. 3.

DETAILED DESCRIPTION OF THE PREFERRED EMBODIMENT

Figure 1:
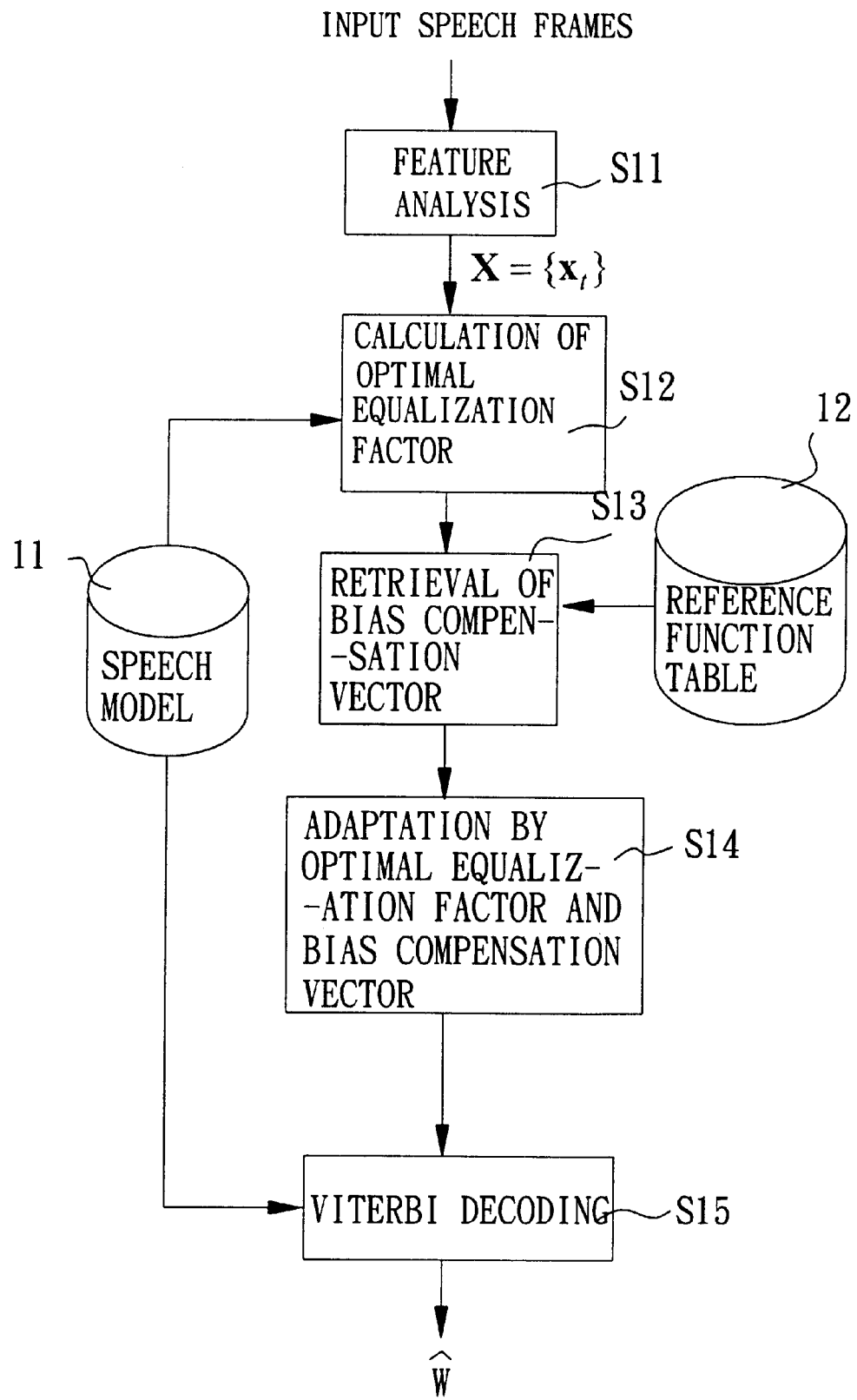
FIG. 1 is the flow chart of the adaptive speech recognition method with noise compensation in accordance with the present invention.

With reference to FIG. 1, there is shown a preferred embodiment of the adaptive speech recognition method with noise compensation in accordance with the present invention, which utilizes a speech model 11 and a reference function table 12 for performing a recognition process to the input speech, which includes a plurality of speech frames, so as to output the recognition result of an optimal word sequence $\hat{W}$.

As shown in FIG. 1, a feature analysis process is first applied to the input speech frame (step S11), so as to generate corresponding feature vector $x_t$ for output. In step S12, for the input feature vector $x_t$ and the corresponding parameters $\theta_{ik}=(\mu_{ik}, \Sigma_{ik})$ of the speech model 11, respective optimal equalization factor is determined by $$\lambda_e = arg\ \max_{\lambda} \log f(x_t | \lambda, \theta_{ik}) = \frac{x_t' \sum_{ik}^{-1} \mu_{ik}}{\mu_{ik}' \sum_{ik}^{-1} \mu_{ik}},$$

HMM model established in a clean environment.

The optimal equalization factor $\lambda_e$ obtained in step S12 is equivalent to the projection of $x_t$ upon $\Sigma_{ik}^{-1}\mu_{ik}$, which is used to adjust the distance of the mean vector of the speech model 11. In step S13, the optimal equalization factor $\lambda_e$ is used as a relational reference index to retrieve the corresponding bias compensation vector $b(\lambda_e)$ from the reference function table 12 for further adjusting the direction change of the mean vector of the speech model 11, thereby removing the projection bias.

Figure 2:
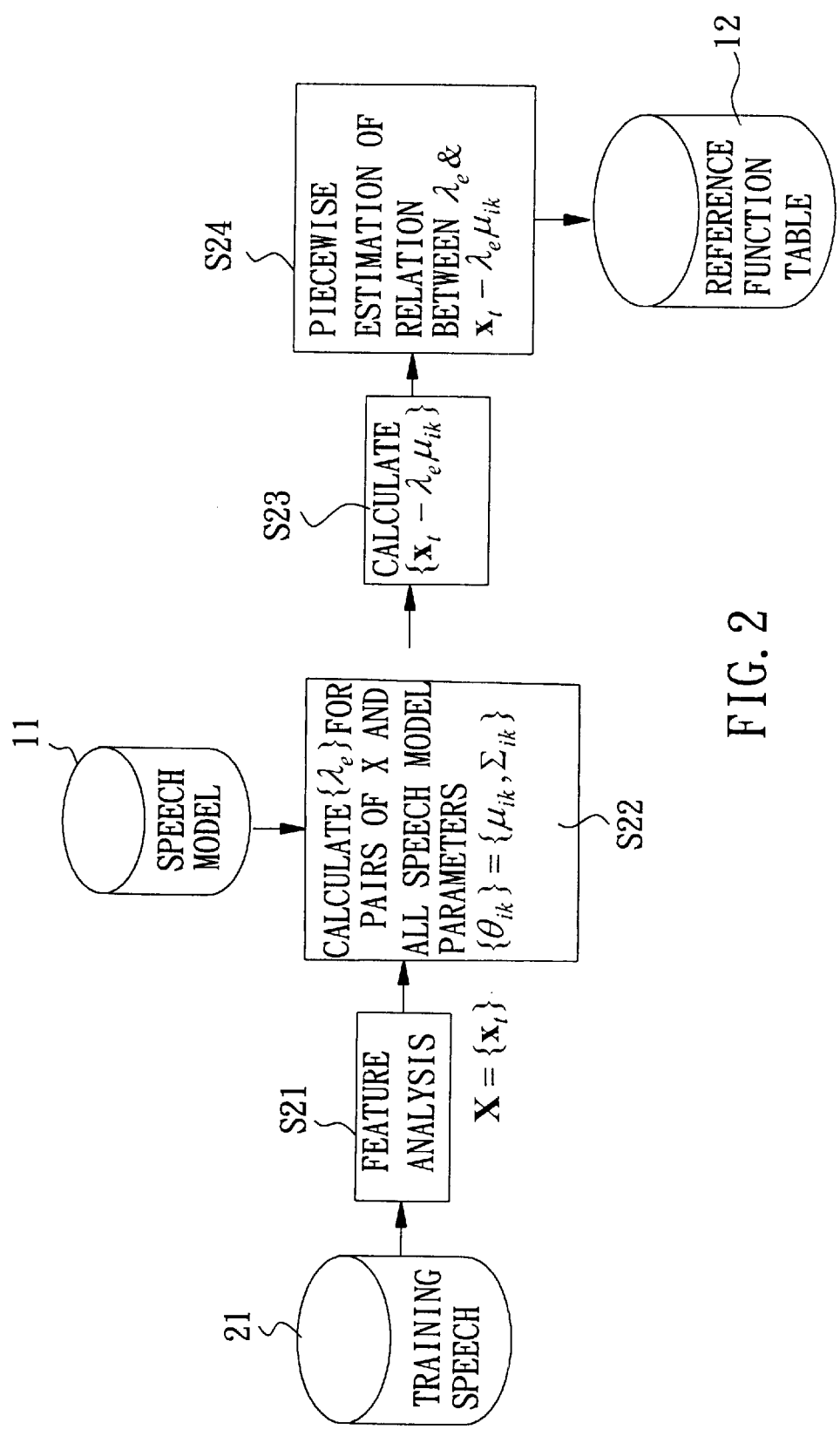
FIG. 2 is a flow chart for establishing a reference function table in accordance with the present invention.

FIG. 2 illustrates an exemplary estimation procedure to establish the reference function table 12, which first collects a small set of noisy training speech data 21, and performs a feature analysis on the training speech data (step S21), so as to generate feature vectors $X=\{x_t\}$ for output. In step 22, a calculation is undertaken based on the HMM speech model 11 and the feature vectors $X=\{x_t\}$ to determine the optimal equalization factors $\{\lambda_e\}$ for pairs of $x_t$ and all probability density functions $\{\theta_{ik}\}=\{\mu_{ik}, \Sigma_{ik}\}$ in HMM speech model 11. Next, the corresponding adaptation bias vectors $\{x_t-\lambda_e\mu_{ik}\}$ are calculated (step S23).

Figure 3:
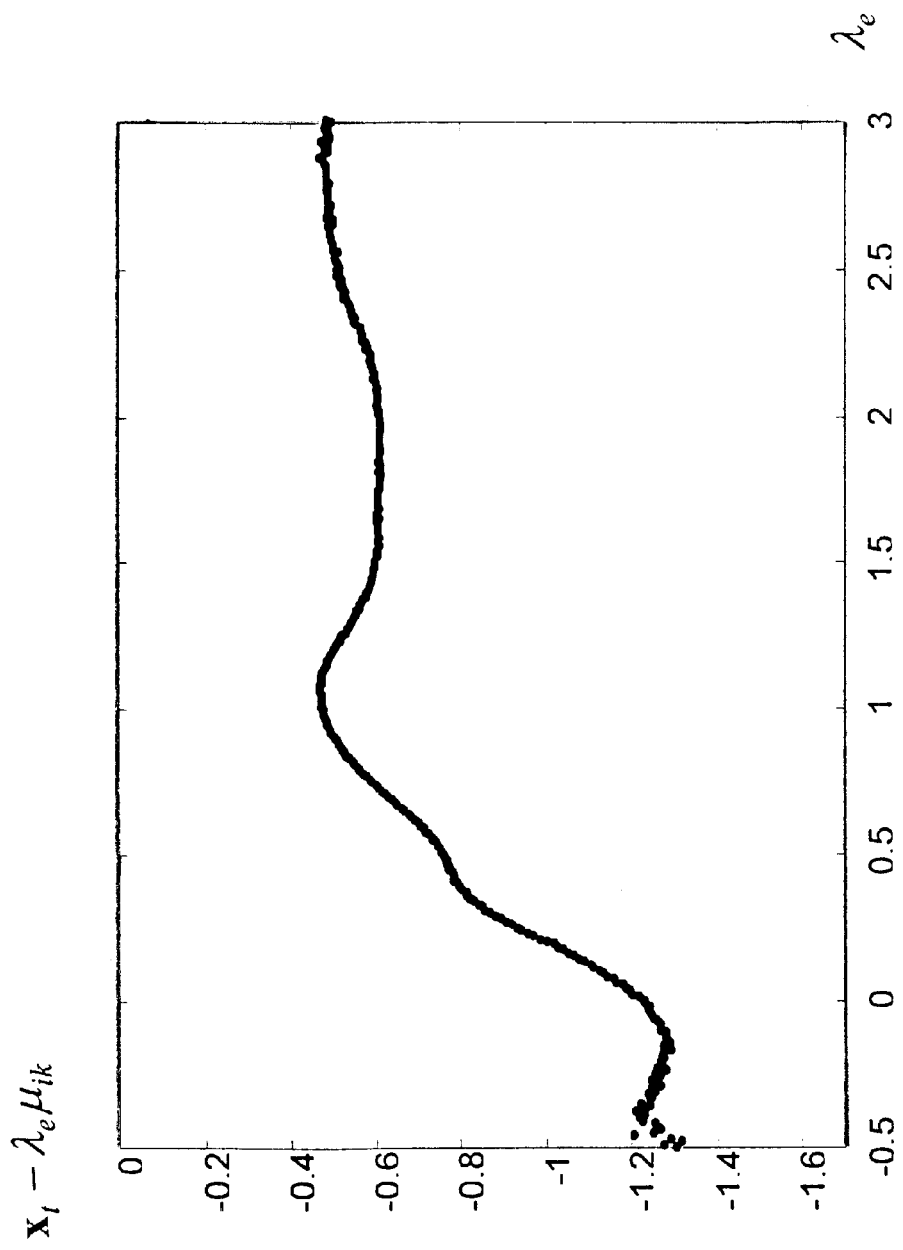
FIG. 3 is a scatter diagram plotted by the process of establishing the reference function table.

These pairs of optimal equalization factors $\{\lambda_e\}$ and bias vectors $\{x_t-\lambda_e\mu_{ik}\}$ are then plotted in a scatter diagram, as shown in FIG. 3. Based on the relation between the optimal equalization factor $\lambda_e$ and the bias vector $x_t-\lambda_e\mu_{ik}$ expressed by the scatter diagram, the bias compensation vectors $b(\lambda_e)$ corresponding to the optimal equalization factors $\{\lambda_e\}$ are piecewisely estimated by averaging the scattered values $\{x_t-\lambda_e\mu_{ik}\}$ where the step size of $\lambda_e$ is specified by, for example, 0.01 (step S24). As such, the reference function table 12 is established, in which the bias compensation vectors $b(\lambda_e)$ can be retrieved by using the optimal equalization factor $\lambda_e$ as an index. An exemplary reference function table established according to FIG. 3 is illustrated in FIG. 4.

With reference to FIG. 1 again, in step S14, based on the calculated optimal equalization factor $\lambda_e$ and the retrieved bias compensation vector $b(\lambda_e)$, the calculation of probability $f(x_t|\theta_{ik})$ in the recognition process for input speech is adapted by $\lambda_e\mu_{ik}+b(\lambda_e)$. That is, the measurement of the probability turns out to be:

$$f(x_t|\lambda_e, b(\lambda_e),\theta_{ik})=(2\pi)^{-D/2}|\Sigma_{ik}|^{-\frac{1}{2}}\times\exp\{-\frac{1}{2}[x_t-\lambda_e\mu_{ik}-b(\lambda_e)]'\Sigma_{ik}^{-1}[x_t-\lambda_e\mu_{ik}-b(\lambda_e)]\}. \quad (8)$$

Because the bias compensation vector $b(\lambda_e)$ is shared by all HMM units $\theta=\{\theta_{ik}\}$, sufficient pairs of $\{x_t-\lambda_e\mu_{ik}\}$ and $\{\lambda_e\}$ can be obtained with only a small set of adaptation speech data, thereby avoiding a known data sparseness problem. Applying the probability measurement of (8) to Viterbi decoding algorithm (step S15), the optimal word sequence $\hat{W}$ associated with the input speech data X is generated for output.

In the above preferred embodiment, the reference function table 12 is established before a speech recognition process is carried out, and thus, when executing the speech recognition process, the reference function table 12 can be referenced and retrieved. Moreover, in the recognition process, the content of the reference function table 12 can be modified, by the method of establishing the table, based on the realistic environment. Specifically, if the recognition rate is not satisfactory, for example less than 50%, the reference function table will be modified on line by using the actual speech samples as adaptation speech data, so that the bias compensation vectors $b(\lambda_e)$ can correctly reflect the actual environment noise, whereby the recognition rate can be further enhanced.

In view of the foregoing, it is appreciated that the present invention is able to perform an online adaptive speech recognition method, and, in the recognition process, both the distance and direction of the mean vector of the probability density function in the speech model are adjusted. Therefore, the performance of a speech recognizer can be significantly promoted.

Although the present invention has been explained in relation to its preferred embodiment, it is to be understood that many other possible modifications and variations can be made without departing from the spirit and scope of the invention as hereinafter claimed.

What is claimed is:

1. An adaptive speech recognition method with noise compensation capable of compensating noises of an input speech by adjusting parameters of a HMM (Hidden Markov Model) speech model, the input speech having a plurality of speech frames, the method comprising the steps of:

(A) determining, based on the plurality of speech frames of the input speech and the speech model, optimal equalization factors for feature vectors of the plurality of speech frames corresponding to each probability density function in the speech model, wherein the optimal equalization factor is determined based on the parameters $\theta_{ik}=(\mu_{ik}, \Sigma_{ik})$ of the speech model, and is equivalent to a projection of the speech frame upon $\Sigma_{ik}^{-1}\mu_{ik}$, where $\mu_{ik}$ and $\Sigma_{ik}$ are respectively the mean vector and covariance matrix of the k-th mixture density function for a state $\hat{s}_t=i$ in the speech model; and (B) adapting the parameters of the speech model by the optimal equalization factor and a bias compensation vector corresponding to and retrieved by the optimal equalization factor, wherein the optimal equalization factor is provided to adjust a distance of the mean vector in the speech model, and the bias compensation vector is provided to adjust a direction change of the mean vector in the speech model.

2. The method as claimed in claim 1, wherein the bias compensation vector is obtained and stored in a reference function table based on noisy speech data before executing a speech recognition process.

3. The method as claimed in claim 1, wherein, in step (B), the bias compensation vector is retrieved from a reference function table by using a corresponding optimal equalization factor as an index, so as to adjust the direction of the mean vector and remove projection bias.

4. The method as claimed in claim 3, wherein, the reference function table is established by the steps of:

calculating the optimal equalization factors for pairs of each speech frame and all parameters in the speech model based on the speech model and the noisy speech data.

calculating adaptation bias vectors corresponding to the optimal equalization factors; and piecewisely estimating, based on the relation between the optimal equalization factors and the adaptation bias vectors, the bias compensation ill vectors by averaging the adaptation bias vectors.

5. The method as claimed in claim 4, wherein, the reference function table can be modified on line by actual input speech in executing a recognition process.

6. The method as claimed in claim 1, wherein, in step (B), based on the determined optimal equalization factor $\lambda_e$ and the retrieved bias compensation vector $b(\lambda_e)$, a calculation of probability for speech recognition is adapted by $\lambda_e\mu_{ik}+b(\lambda_e)$, where $\mu_{ik}$ is the mean vector of the k-th mixture density function for a state $\hat{s}_t=i$ in the speech model.

7. The method as claimed in claim 1, further comprising a step, before step (A), for performing a feature analysis on the speech frames of the input speech.

8. The method as claimed in claim 1, further comprising a step, after step (A), for executing a Viterbi decoding algorithm.

9. An adaptive speech recognition method with noise compensation capable of compensating noises of an input speech by adjusting parameters of a HMM (Hidden Markov Model) speech model, the input speech having a plurality of speech frames, the method comprising the steps of:

(A) determining, based on the plurality of speech frames of the input speech and the speech model, optimal equalization factors for feature vectors of the plurality of speech frames corresponding to each probability density function in the speech model; and (B) adapting the parameters of the speech model by the optimal equalization factor and a bias compensation vector corresponding to and retrieved by the optimal equalization factor, wherein the optimal equalization factor is provided to adjust a distance of the mean vector in the speech model, and the bias compensation vector is provided to adjust a direction change of the mean vector in the speech model, wherein the bias compensation vector is retrieved from a reference function table by using a corresponding optimal equalization factor as an index, so as to adjust the direction of the mean vector and remove projection bias.

* * * * *